(12) United States Patent
Bellasalma

(10) Patent No.: US 6,619,173 B2
(45) Date of Patent: Sep. 16, 2003

(54) VIBRATORY FIBER CHOPPER

(75) Inventor: Jay Bellasalma, Yorba Linda, CA (US)

(73) Assignee: Masco Corporation Taylor, Taylor, MI (US)

( * ) Notice: Subject to any disclaimer, the term of this patent is extended or adjusted under 35 U.S.C. 154(b) by 129 days.

(21) Appl. No.: 09/923,639

(22) Filed: Aug. 7, 2001

(65) Prior Publication Data

US 2003/0029293 A1 Feb. 13, 2003

(51) Int. Cl.[7] ............................................. B23B 27/22
(52) U.S. Cl. ...................... 83/627; 83/601; 83/701; 83/956; 82/73; 82/79; 82/88; 82/158; 82/504
(58) Field of Search .................... 83/584, 602, 491, 83/524, 535, 597, 628, 701, 613, 616, 165, 167, 436.3, 658, 915.5, 956; 82/73, 79, 88, 158, 904, 627

(56) References Cited

U.S. PATENT DOCUMENTS

| | | | | |
|---|---|---|---|---|
| 461,950 A | * | 10/1891 | Cranston | 83/378 |
| 1,230,991 A | * | 6/1917 | Briggs | 83/757 |
| 2,626,664 A | * | 1/1953 | Regele | 83/588 |
| 3,316,791 A | * | 5/1967 | Etal | 83/566 |
| 3,598,163 A | * | 8/1971 | Urschel et al. | 83/328 |
| 3,921,270 A | | 11/1975 | Upton | |
| 4,180,906 A | | 1/1980 | May | |
| 4,287,799 A | | 9/1981 | Fujita et al. | |
| 4,373,650 A | | 2/1983 | Gay | |
| 4,478,122 A | * | 10/1984 | Hunter | 83/549 |
| 5,150,641 A | * | 9/1992 | Werner | 83/647 |
| 5,271,301 A | | 12/1993 | Hiraoka et al. | |
| 5,328,494 A | | 7/1994 | Kelman et al. | |
| 5,697,560 A | | 12/1997 | Bennett | |
| 5,737,989 A | * | 4/1998 | Sung | 83/625 |
| 5,791,587 A | | 8/1998 | Pasquale | |
| 5,806,387 A | | 9/1998 | Jander | |
| 5,857,370 A | | 1/1999 | Grenz et al. | |
| 6,041,686 A | * | 3/2000 | Lihl et al. | 83/628 |
| 6,079,304 A | * | 6/2000 | Bisceglia | 83/51 |
| 6,152,657 A | | 11/2000 | Packer et al. | |
| 6,158,315 A | * | 12/2000 | Nowotny et al. | 83/23 |
| 6,168,355 B1 | | 1/2001 | Wardell | |

* cited by examiner

Primary Examiner—Allan N. Shoap
Assistant Examiner—Phong H. Nguyen
(74) Attorney, Agent, or Firm—Emch, Schaffer, Schaub & Porcello Co., L.P.A.

(57) ABSTRACT

This fiber chopper overcomes the disadvantages of the previous cutting rollers for chopping continuous filaments. The apparatus includes a means for feeding continuous fibers to a vibrating cutting blade. The vibrating blades engage the continuous fiber and chops them into discrete fiber lengths. A vibrating head vibrates the cutting blades through a vibrating table.

9 Claims, 4 Drawing Sheets

VIBRATORY FIBER CHOPPER

TECHNICAL FIELD

This invention relates to an apparatus and process for chopping continuous fibers into discrete fiber lengths. More specifically, the apparatus vibrates the cutting blades to chop the discrete fiber lengths.

BACKGROUND OF THE INVENTION

Fiber choppers typically use cutting rollers to break continuous rovings into individual short fiber lengths. These choppers use a hard rubber back up roll as an anvil which cooperates with the cutting roller carrying one or more transversely extending blades. The back up roller and cutting roller cooperate to chop a discrete fiber length off the continuous roving each time a rotor blade contacts the back up roll.

These cutting rollers work well for producing chopped fibers such as conventional chopped glass fibers.

Continuous filaments include a single filament or a plurality of filaments in a strand, with the filament having continuous length or substantial length, e.g., greater than one foot. A plurality of filaments is a plurality of segments of a single filament in adjacent relationships, such as occurs when a single filament is wrapped around a bobbin tube. Formation of the filaments also normally involves treating the filaments with a size to enhance the properties of the fiberglass in subsequent operations.

Recent advances, however, in after coatings for continuous filaments make the fibers more difficult to chop. The filaments are stiff and tuff and often have rubbery coatings. Conventional cutting rollers often don't cut the stiff fibers. Results often leave the fibers bent or kinked. The typical result is not the clean cut industry desires. Further, the cutting rollers often break blades or do not penetrate the rubbery coatings.

BRIEF SUMMARY OF THE INVENTION

I have developed a process and apparatus which overcomes the disadvantages of the previous cutting rollers for chopping continuous filaments. My apparatus for chopping continuous fibers into discrete fiber lengths includes at least one vibrating head, at least one vibrating table and at least one cutting head. The apparatus also includes at least one means for feeding at least one continuous fiber to the cutting head. Preferably, the continuous fiber passes between the cutting blade and a fixed head for chopping the continuous fibers into discrete fiber lengths.

Preferably, the fixed head is a hard cutting surface and a pair of nip rollers feed continuous fibers to the cutting blades. Preferably, a pair of flex arms support the vibrating table.

DETAILED DESCRIPTION OF THE INVENTION

The apparatus of this invention chops continuous fibers into discrete fiber lengths. The chopper comprises at least one means that feeds at least one continuous fiber to at least one vibrating cutting head. The vibrating head vibrates the cutting blade through a vibrating table.

Figure 1:
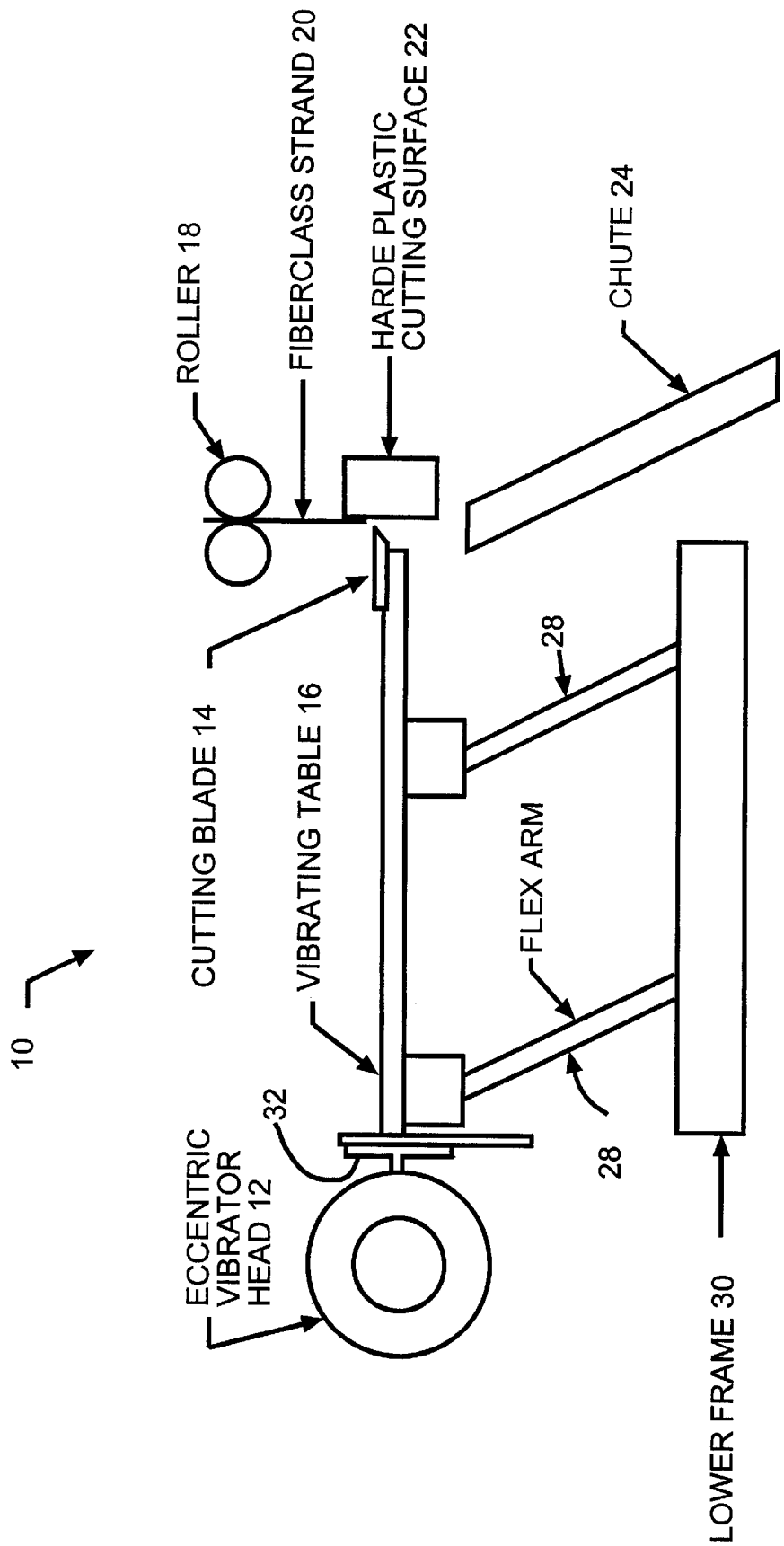
FIG. 1 is a schematic side view of the apparatus for continuously chopping fiber strands into chopped fibers.

FIG. 1 shows apparatus 10 for chopping continuous fibers into chopped fibers. Apparatus 10 includes vibrator 12 which vibrates cutting blade 14 through vibrating table 16. Nip rollers 18 feed strand 20 to vibrating cutting blade 14. Strand 20 passes between blade 14 and cutting surface 22 for chopping. Chute 24 collects the chopped strands. A pair of flex arms 28 support table 16. Frame 30 supports flex arms 28 and provides them with a stable base.

Vibrator head 12 includes extension arm 32 that engages vibrating table 16.

Vibrating eccentric vibrator head 12 may be carried out by any number of methods. Vibration produced by the stop-and-go motion of the cutter edge during cutting is called self-induced vibration. Ordinarily, it has an extremely minute amplitude but such a cutting can be regarded as vibration cutting in a broad sense. If its amplitude exceeds a certain point, however, such vibration becomes chattering.

Figure 2:
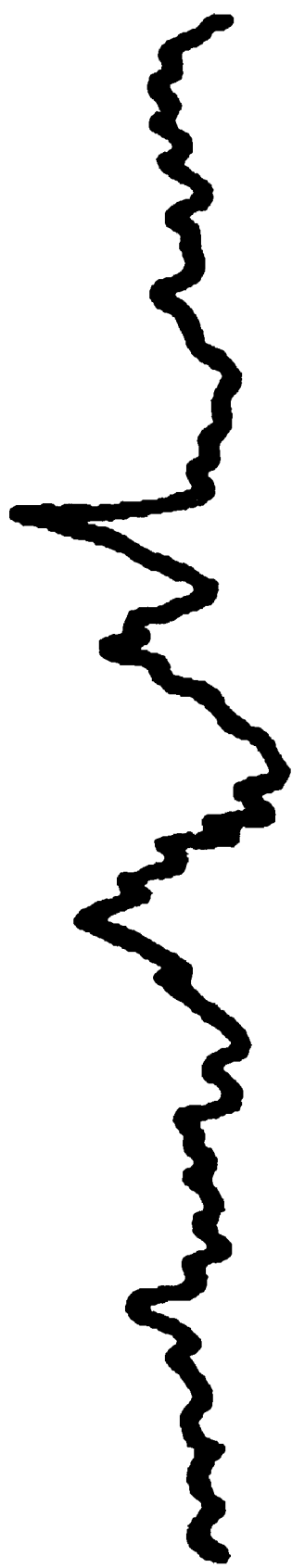
FIG. 2 shows wavelengths for irregular vibrations at the cutting blade edge.

FIG. 2 shows this vibration cutting to be very irregular. While in some industries irregular cutting may be undesirable, often irregular chopping of reinforcements to reinforce plastics is desirable.

More uniform vibrating is carried out by forcing the cutting blade to vibrate. This method uses a vibration generator, an electrostriction or magneto-striction type vibrator excited by an oscillator to vibrate eccentric vibrator head 12. Other types such as an electromagnetic type, electro-hydraulic type and mechanical-hydraulic type are also known.

Figure 3:
FIG. 3 shows wavelengths for regular vibrations having a short amplitude at the cutting edge.

FIG. 3 shows this uniform vibration with a short amplitude.

Still another non-forcing method uses output shafts, biased balls and a spring for transmitting vibrations to eccentric vibration head (12). This method amplifies small vibrations and suppresses large vibrations. This arrangement vibrates with a larger amplitude. As a result, the vibrating frequency can be kept substantially uniform. This makes it possible to increase the cutting speed and utilize the vibrations more effectively.

Figure 4:
FIG. 4 shows a wavelength for regular vibrations having a large amplitude at the cutting edge.

FIG. 4 shows the large amplitude, uniform wavelength of the non-forcing method.

This unique chopper was designed for processing reinforcements having a specific coating thereon. Preferably, the mixture developed for coating glass fiber reinforcements for thermoset resins such as polyesters. First, the glass is coated and dried. After drying, the roving then is wrapped around chilled mandrels and chopped into an appropriate length.

These after coated reinforcements are described in U.S. patent application Ser. No. 09/829,095, filed Apr. 9, 2001 (attorney Docket No. 00215) and herein incorporated by reference.

In addition to these embodiments, persons skilled in the art can see that numerous modifications and changes may be made to the above invention without departing from the intended spirit and scope thereof.

I claim:

1. An apparatus for chopping continuous fibers into discrete fiber lengths comprising:
   at least one vibrating table supporting a fixed cutting blade;
   at least one vibrator head engaging the vibrating table to cause said table to move in a reciprocating movement;
   a flexible means for flexibly supporting the vibrating table; said blade cutting in the same direction as the movement of said table; and at least one fixed head having a cutting surface spaced apart from said table in the same direction as said reciprocating movement wherein the continuous fiber to be chopped passes between the cutting blade and the cutting surface.

2. An apparatus according to claim 1 including a chute for collecting the discrete fiber lengths.

3. An apparatus according to claim 1 wherein the vibrator head is an eccentric vibrator head.

4. An apparatus according to claim 1 wherein the vibrator head includes an extension arm that engages the vibrating table.

5. An apparatus according to claim 1 wherein the fixed head has a hard plastic cutting surface.

6. An apparatus according to claim 1 wherein the cutting blade has a vibration frequency that is irregular.

7. An apparatus according to claim 1 wherein the cutting blade has a vibration frequency that is uniform.

8. An apparatus according to claim 7 wherein the vibration frequency has a small amplitude.

9. An apparatus according to claim 7 wherein the vibration frequency has a large amplitude.

* * * * *

UNITED STATES PATENT AND TRADEMARK OFFICE
CERTIFICATE OF CORRECTION

PATENT NO. : 6,619,173 B2
DATED : September 16, 2003
INVENTOR(S) : Jay Bellasalma It is certified that error appears in the above-identified patent and that said Letters Patent is hereby corrected as shown below:

<u>Title page,</u>
Item [73], should read:
-- [73] Assignee: Masco Corporation, Taylor, MI --

Signed and Sealed this

Thirteenth Day of January, 2004

JON W. DUDAS
*Acting Director of the United States Patent and Trademark Office*